(12) United States Patent
Kamata et al.

(10) Patent No.: US 8,980,451 B2
(45) Date of Patent: Mar. 17, 2015

(54) MAGNETIC RECORDING MEDIUM, METHOD OF MANUFACTURING THE SAME, AND MAGNETIC RECORDING APPARATUS

(75) Inventors: Yoshiyuki Kamata, Tokyo (JP); Kaori Kimura, Yokohama (JP); Takeshi Iwasaki, Inagi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 73 days.

(21) Appl. No.: 13/185,880

(22) Filed: Jul. 19, 2011

(65) Prior Publication Data

US 2012/0069468 A1     Mar. 22, 2012

(30) Foreign Application Priority Data

Sep. 17, 2010  (JP) .................................. 2010-209979

(51) Int. Cl.
*G11B 5/65* (2006.01)
*G11B 5/82* (2006.01)
*G11B 5/74* (2006.01)
*B82Y 10/00* (2011.01)
*G11B 5/855* (2006.01)

(52) U.S. Cl.
CPC .. *G11B 5/82* (2013.01); *G11B 5/65* (2013.01); *G11B 5/746* (2013.01); *B82Y 10/00* (2013.01); *G11B 5/743* (2013.01); *G11B 5/855* (2013.01)
USPC ..................................................... 428/836.3

(58) Field of Classification Search
CPC ........... B82Y 10/00; G11B 5/82; G11B 5/855
USPC ................ 428/826, 831.2, 847.7, 848.1, 832; 360/135, 131, 99.08, 99.07; 257/607; 216/22; 204/192.1; 438/459
See application file for complete search history.

(56) References Cited

U.S. PATENT DOCUMENTS

| | | | |
|---|---|---|---|
| 6,014,296 | A | 1/2000 | Ichihara et al. |
| 6,221,519 | B1 | 4/2001 | Doi et al. |
| 6,266,354 | B1 | 7/2001 | Chino et al. |
| 6,495,240 | B1 | 12/2002 | Wada et al. |
| 6,630,255 | B1 | 10/2003 | Litvinov et al. |
| 6,984,529 | B2 | 1/2006 | Stojakovic et al. |

(Continued)

FOREIGN PATENT DOCUMENTS

| | | |
|---|---|---|
| JP | 02-207418 | 8/1990 |
| JP | 03-040219 | 2/1991 |

(Continued)

OTHER PUBLICATIONS

U.S. Appl. No. 12/544,606.

(Continued)

*Primary Examiner* — Kevin M. Bernatz
(74) *Attorney, Agent, or Firm* — Nixon & Vanderhye, P.C.

(57) ABSTRACT

According to one embodiment, in a method of manufacturing a magnetic recording medium which is configured such that a ferromagnetic recording part is formed on a substrate in a desired track pattern or a desired bit pattern, a ferromagnetic film is formed on the substrate, and then a mask is formed on the ferromagnetic film, the mask having an opening above a region for isolating the ferromagnetic film between tracks or bits. Subsequently, a B-based gas is radiated on the region of the ferromagnetic film through the opening of the mask, thereby increasing a B content of the region to nonmagnetize the region.

6 Claims, 8 Drawing Sheets

(56) References Cited

U.S. PATENT DOCUMENTS

| | | |
|---|---|---|
| 7,067,207 B2 | 6/2006 | Kamata et al. |
| 7,100,263 B2 | 9/2006 | Imada et al. |
| 7,225,528 B2 | 6/2007 | Suwa et al. |
| 7,972,945 B2 | 7/2011 | Sasaki et al. |
| 8,002,997 B2 | 8/2011 | Kamata et al. |
| 8,017,023 B2 | 9/2011 | Kamata et al. |
| 8,507,116 B2* | 8/2013 | Iwasaki et al. ............ 428/836.2 |
| 2001/0055852 A1 | 12/2001 | Moise et al. |
| 2002/0090827 A1 | 7/2002 | Yokoshima et al. |
| 2002/0127822 A1* | 9/2002 | Ueyanagi et al. ............ 438/459 |
| 2004/0020894 A1 | 2/2004 | Williams et al. |
| 2004/0253817 A1 | 12/2004 | Imada et al. |
| 2005/0000934 A1 | 1/2005 | Nakatani et al. |
| 2005/0086795 A1 | 4/2005 | Suwa et al. |
| 2005/0153169 A1 | 7/2005 | Watanabe et al. |
| 2005/0175790 A1 | 8/2005 | Aoyama et al. |
| 2005/0214450 A1 | 9/2005 | Aoyama et al. |
| 2005/0243467 A1 | 11/2005 | Takai et al. |
| 2005/0284842 A1 | 12/2005 | Okawa et al. |
| 2006/0003551 A1 | 1/2006 | Mancini et al. |
| 2006/0021966 A1 | 2/2006 | Hattori et al. |
| 2006/0124585 A1 | 6/2006 | Suwa et al. |
| 2006/0154113 A1 | 7/2006 | Watanabe et al. |
| 2006/0183004 A1 | 8/2006 | Hattori et al. |
| 2006/0222897 A1 | 10/2006 | Kamata et al. |
| 2006/0222899 A1 | 10/2006 | Sugimura et al. |
| 2007/0059562 A1 | 3/2007 | Hattori et al. |
| 2007/0070547 A1 | 3/2007 | Kamata et al. |
| 2007/0211592 A1 | 9/2007 | Sakurai et al. |
| 2007/0212811 A1* | 9/2007 | Hanawa et al. ............... 438/104 |
| 2007/0224339 A1 | 9/2007 | Kamata et al. |
| 2007/0263324 A1 | 11/2007 | Allen et al. |
| 2007/0281078 A1 | 12/2007 | Kikitsu et al. |
| 2008/0007868 A1 | 1/2008 | Nishida et al. |
| 2008/0075845 A1 | 3/2008 | Sonobe et al. |
| 2008/0078739 A1 | 4/2008 | Hibi et al. |
| 2008/0093336 A1 | 4/2008 | Lee et al. |
| 2008/0158718 A1 | 7/2008 | Kobayashi et al. |
| 2008/0174914 A1 | 7/2008 | Takai et al. |
| 2008/0180844 A1* | 7/2008 | Takeda et al. ................ 360/135 |
| 2008/0217615 A1 | 9/2008 | Kerber |
| 2008/0274381 A1 | 11/2008 | Fullerton et al. |
| 2009/0010567 A1 | 1/2009 | Akiba et al. |
| 2009/0023078 A1 | 1/2009 | Gutmann et al. |
| 2009/0080109 A1* | 3/2009 | Fukuzawa et al. ............ 360/122 |
| 2009/0117409 A1* | 5/2009 | Lee et al. ...................... 427/131 |
| 2009/0123660 A1 | 5/2009 | Inaba et al. |
| 2009/0214895 A1 | 8/2009 | Hinoue et al. |
| 2009/0214898 A1 | 8/2009 | Hinoue et al. |
| 2009/0244785 A1 | 10/2009 | Kikuchi et al. |
| 2009/0273861 A1 | 11/2009 | Tanaka et al. |
| 2009/0290250 A1 | 11/2009 | Fukushima et al. |
| 2009/0305081 A1 | 12/2009 | Dai et al. |
| 2009/0308837 A1 | 12/2009 | Albrecht et al. |
| 2009/0314740 A1 | 12/2009 | Ikemoto et al. |
| 2009/0323219 A1 | 12/2009 | Fukushima et al. |
| 2010/0000965 A1 | 1/2010 | Kamata et al. |
| 2010/0006537 A1 | 1/2010 | Kamata et al. |
| 2010/0018946 A1 | 1/2010 | Isowaki et al. |
| 2010/0018947 A1 | 1/2010 | Kimura et al. |
| 2010/0039730 A1 | 2/2010 | Ishibashi et al. |
| 2010/0047625 A1 | 2/2010 | Kamata et al. |
| 2010/0053813 A1* | 3/2010 | Fukushima et al. .......... 360/131 |
| 2010/0059476 A1 | 3/2010 | Yamamoto et al. |
| 2010/0147791 A1 | 6/2010 | Isowaki et al. |
| 2010/0155231 A1 | 6/2010 | Watanabe et al. |
| 2010/0200954 A1* | 8/2010 | Del Agua Borniquel et al. ............................ 257/607 |
| 2010/0214694 A1 | 8/2010 | Kimura et al. |
| 2010/0214695 A1 | 8/2010 | Isowaki et al. |
| 2010/0215989 A1 | 8/2010 | Isowaki et al. |
| 2010/0232054 A1 | 9/2010 | Mabuchi et al. |
| 2010/0297836 A1 | 11/2010 | Sasaki et al. |
| 2011/0000880 A1 | 1/2011 | Kamata et al. |
| 2011/0019308 A1* | 1/2011 | Fukushima ................... 360/110 |
| 2011/0076514 A1* | 3/2011 | Kurata .......................... 428/800 |
| 2011/0132752 A1 | 6/2011 | Shirotori et al. |
| 2012/0237795 A1* | 9/2012 | Sakurai et al. ................ 428/800 |
| 2012/0273456 A1* | 11/2012 | Sakurai et al. .................. 216/22 |

FOREIGN PATENT DOCUMENTS

| | | |
|---|---|---|
| JP | 03-035732 | 5/1991 |
| JP | 05-205257 | 8/1993 |
| JP | 07-054584 | 2/1995 |
| JP | 11-328652 | 11/1999 |
| JP | 2000-286241 | 10/2000 |
| JP | 2000-298823 | 10/2000 |
| JP | 2002-056518 | 2/2002 |
| JP | 2002-359138 | 12/2002 |
| JP | 2003-183859 | 7/2003 |
| JP | 2004-164692 | 6/2004 |
| JP | 2004-227667 | 8/2004 |
| JP | 2005-042143 | 2/2005 |
| JP | 2005-050468 | 2/2005 |
| JP | 2005-056535 | 3/2005 |
| JP | 2005-070650 | 3/2005 |
| JP | 2005-071542 | 3/2005 |
| JP | 2005-135455 | 5/2005 |
| JP | 3686067 | 6/2005 |
| JP | 2005-228912 | 8/2005 |
| JP | 4319057 | 8/2005 |
| JP | 2005-317155 | 11/2005 |
| JP | 2006-012332 | 1/2006 |
| JP | 2006-147148 | 6/2006 |
| JP | 2006-196143 | 7/2006 |
| JP | 2007-087053 | 4/2007 |
| JP | 2007-095115 | 4/2007 |
| JP | 2007-220164 | 8/2007 |
| JP | 2007-242182 | 9/2007 |
| JP | 2007-273067 | 10/2007 |
| JP | 2008-016102 | 1/2008 |
| JP | 2008-065944 | 3/2008 |
| JP | 2008-135092 | 6/2008 |
| JP | 2008-210450 | 9/2008 |
| JP | 2009-076924 | 4/2009 |
| JP | 2009-116979 | 5/2009 |
| JP | 4309944 | 5/2009 |
| JP | 2009-170007 | 7/2009 |
| JP | 2009-181674 | 8/2009 |
| JP | 2009-199683 | 9/2009 |
| JP | 2009-199691 | 9/2009 |
| JP | 2009-238317 | 10/2009 |
| JP | 4405588 | 11/2009 |
| JP | 2009-301655 | 12/2009 |
| JP | 2010-033636 | 2/2010 |
| JP | 2010-092525 | 4/2010 |
| JP | 2010-218610 | 9/2010 |
| JP | 2010-244666 | 10/2010 |
| WO | 99/35657 | 7/1999 |
| WO | 2008/069082 | 6/2008 |
| WO | WO 2009087837 A1 * | 7/2009 ............... G11B 5/84 |

OTHER PUBLICATIONS

U.S. Appl. No. 12/882,113.
U.S. Appl. No. 13/164,601, Final Office Action mailed Sep. 24, 2012.
U.S. Appl. No. 13/175,485, response to non-final Office Action filed Dec. 21, 2012.
U.S. Appl. No. 13/185,822, awaiting USPTO action.
U.S. Appl. No. 13/164,601, filed Jun. 20, 2011, Takeshi Iwasaki et al.
U.S. Appl. No. 12/544,606, filed Aug. 20, 2009, Yoshiyuki Kamata et al.
U.S. Appl. No. 12/882,113, filed Sep. 14, 2010, Yoshiyuki Kamata et al.
English-language machine translation of JP2007-242182.
Iwasaki et al., U.S. Appl. No. 13/175,485, filed Jul. 1, 2011.
Kamata et al., U.S. Appl. No. 13/185,822, filed Jul. 19, 2011.
English-language machine translation of JP 3034879, published 2000.
English-language machine translation of JP 2002-501300, published 2002.

* cited by examiner

MAGNETIC RECORDING MEDIUM, METHOD OF MANUFACTURING THE SAME, AND MAGNETIC RECORDING APPARATUS

CROSS-REFERENCE TO RELATED APPLICATIONS

This application is based upon and claims the benefit of priority from prior Japanese Patent Application No. 2010-209979, filed Sep. 17, 2010, the entire contents of which are incorporated herein by reference.

FIELD

Embodiments described herein relate generally to a magnetic recording medium, a method of manufacturing the same, and a magnetic recording apparatus.

BACKGROUND

In recent years, attention has been paid to, as high-density magnetic recording media, discrete track recording patterned media (DTR media) in which recording tracks are physically isolated, and bit patterned media (BPM) in which recording bits are physically isolated also in a down-track direction (disk circumferential direction).

Since this type of patterned media constitutes a magnetic recording apparatus (HDD) by being combined with a recording head which levitates with a levitation amount of 10 nm or less, the surface planarity of the patterned media is important. In order to stably levitate the recording head, the surface asperities of the patterned media should be, notably, 10 nm or less. Thus, the surface is generally planarized by burying a nonmagnetic material in gaps between physically discrete recording tracks or recording bits.

However, the addition of fabrication steps, such as burying a nonmagnetic material and planarization, leads to process damage, and degradation in productivity and an increase in cost due to the increase in number of steps.

DETAILED DESCRIPTION

In general, according to one embodiment, in a method of manufacturing a magnetic recording medium which is configured such that a ferromagnetic recording part is formed on a support substrate (the support substrate is also called a substrate) in a desired track pattern or a desired bit pattern, a ferromagnetic film is formed on the support substrate, and then a mask is formed on the ferromagnetic film, the mask having an opening above a region for isolating the ferromagnetic film between tracks or bits. Subsequently, a B-based gas is radiated on the region the ferromagnetic film through the opening of the mask. This enables to increase B content of the region and nonmagnetize the region.

As has been described above, in the DTR media and BPM, the surface asperities need to be set at 10 nm or less. The inventors previously devised a patterned medium fabrication method which can suppress a side erase phenomenon and a side read phenomenon while securing levitation properties of the recording head, without carrying out a nonmagnetic material burying step or a planarization step. In this method, a 10-nm-thick portion of a 15-nm-thick ferromagnetic recording layer is physically removed, and the remaining 5-nm-thick is magnetically deactivated by ion beam etching (IBE) using a mixture gas of He (helium) gas and $N_2$ (nitrogen) gas. In this structure, although the physical asperity is 10 nm, magnetic isolation with a depth of 15 nm is effected.

However, in order to achieve a high recording density of 1 $Tb/in^2$ or more, it is notable to decrease as much as possible the gap (spacing) between the recording medium and the recording head, to improve the recording performance of the recording head, and to improve the linear recording density (bpi). As a method of temporarily decreasing the levitation amount of the recording head, dynamic flight height control (DFH) is known. By making use of the DFH, the space between the recording medium and the recording head can be temporarily minimized. However, the surface asperity of the DTR medium/BPM is greater than 10 nm, the DEN control would become very unstable. Thus, in order to achieve the recording density of 1 $Tb/in^2$ or more, it is necessary to decrease the surface asperity of the DTR medium/BPS as much as possible.

Taking the above problem into account, the inventors have devoted themselves to studies and found that nonmagnetization (zero magnetization) can be achieved by mixing B (boron) in a ferromagnetic recording layer. If DTR medium/BPM is fabricated by making use of this phenomenon, the surface asperity can be reduced to 4 nm or less.

In order to mix B in the ferromagnetic recording layer, a magnetism-deactivating process is performed by IBE using $B_2H_6$, $BF_3$, or borazine $(BH-NH)_3$, in place of $He+N_2$ gas. A general B-based gas ($B_2H_6$, $BF_3$) is a toxic, corrosive gas. In the case where DTR media/BPM manufacturing equipment does not have a mechanism for eliminating this kind of gas, it is notable to use borazine $(BH-NH)_3$ as a high-safety gas.

In general, as the ferromagnetic recording layer, a CoCrPt alloy is used in DTR media, and a CoPt alloy is used in BPS. If a mixing amount is less 5 at % by mixing B into the CoPt alloy, granulation of CoCrPt or CoPt is promoted and coercivity (Hc) increases. If the mixing amount is 5 at % or more and is less than 15 at %, the ferromagnetic recording layer becomes soft magnetic, and Hc is 1000 Oe or less. If the mixing amount is 15 at % or more, Hc becomes zero. In other words, by setting the mixing amount of B at 15 at % or more, the ferromagnetic recording part can surely be isolated.

The present embodiment is based on the above-described result of studies, and relates to a method of manufacturing a patterned medium which has good surface planarity and is adaptive to a recording density of 1 Tb/in$^2$ or more.

First Embodiment

To begin with, in order to manufacture a patterned medium, a UV imprint stamper (resin stamper) is needed. A resin stamper, which is fabricated by a well-known method, can be used.

FIG. 1A to FIG. 1E are cross-sectional views illustrating fabrication steps of a UV imprint stamper, which is used in the first embodiment.

Figure 1A:
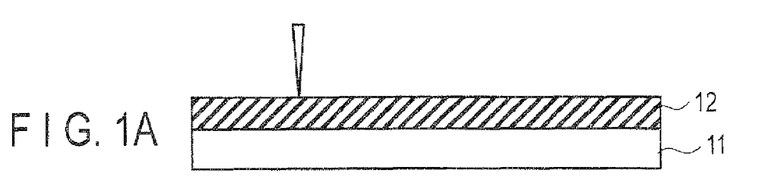
FIGS. 1A, 1B, 1C, 1D and 1F are cross-sectional views illustrating fabrication steps of a stamper for UV imprint, which is used in a first embodiment.
Figure 1B:
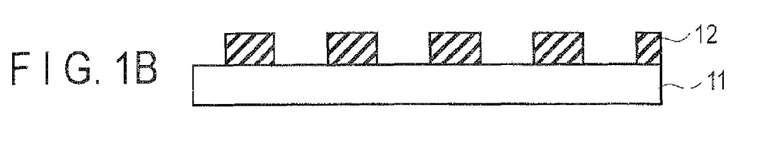

As shown in FIG. 1A, an electron beam (EB) drawing resist is spin-coated on a Si substrate 11 with a diameter of, e.g. 6 inches. Then, by prebaking the resultant structure for three minutes at 200° C., a resist layer 12 with a thickness of about 50 nm is formed on the Si substrate 11. Subsequently, using an EB drawing apparatus, a pattern shown in FIG. 2 or FIG. 3 was directly drawn on the resist layer 12 on the substrate 11. By developing the resist layer 12 by dipping it in a developing liquid for 90 seconds, a master disk, as shown in FIG. 1B, was fabricated.

Figure 2:
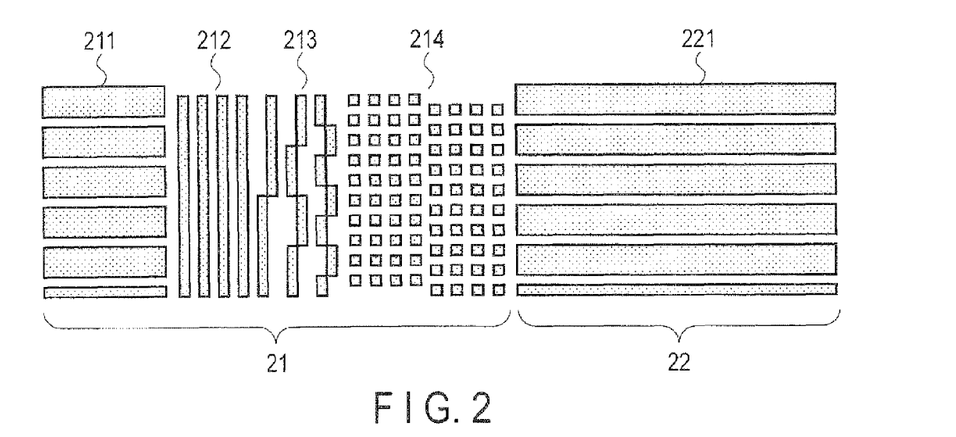
FIG. 2 is a plan view showing a sector pattern of DTR media.
Figure 3:
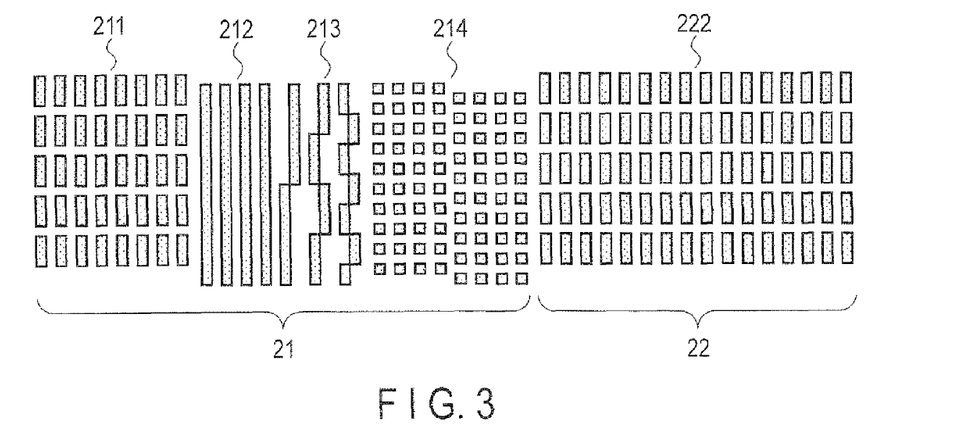
FIG. 3 is a plan view showing a sector pattern of BPM.

Patterns of FIG. 2 and FIG. 3 are examples of sectors. FIG. 2 is an example of a DTR medium, and FIG. 3 is an example of a BPM. The sector is divided into a servo data area 21 on which a servo pattern is formed, and a record data area 22 for storing record data. The servo data area 21 is divided into a preamble pattern 211 for rotation control, a sector information pattern 212 for sector identification, a track information pattern 213 for identifying tracks in the radial direction, and a burst pattern 214 for aligning positions of tracks. In the case where the record data area 22 is continuous tracks 221, the record data area 22 becomes a so-called discrete track medium. Further, in the case where the record data area 22 is record bits 222 which are divided so as to correspond to each bit, the record data area 22 becomes a so-called bit patterned medium. The present embodiment is applicable to either medium.

Figure 1C:
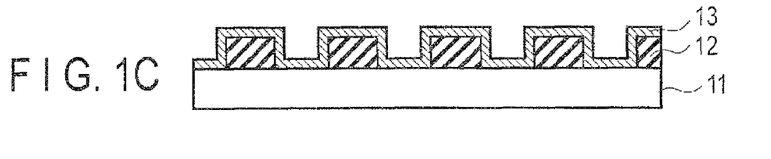
Figure 1D:
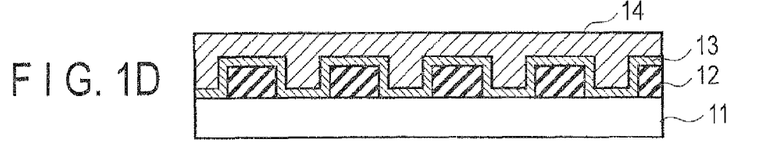

Then, a Ni stamper was fabricated. Specifically, as shown in FIG. 1C, a Ni conductive film 13 with a thickness of about 10 nm was formed on the master disk by sputtering. Subsequently, as shown in FIG. 1D, the master disk with the conductive film was dipped in a nickel sulfamate plating solution, and thereby a Ni plating layer 14 was formed. Then, the resist layer 12 adhering to the surface was removed by oxygen RIE, and thereby a Ni stamper was fabricated.

Figure 1E:
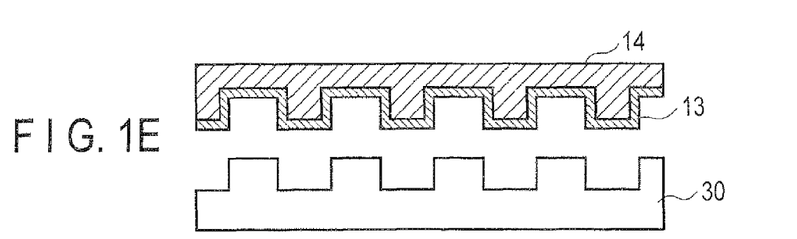

Thereafter, the Ni stamper was set in an injection molding apparatus, and a resin stamper 30 was fabricated by injection molding, as shown in FIG. 1E. Although a cyclic olefin polymer was used for a molding material of the resin stamper 30, polycarbonate material can also be used for the molding material.

Next, referring to FIG. 4A to FIG. 4H, a process of manufacturing a patterned medium according to the present embodiment is described.

Figure 4A:
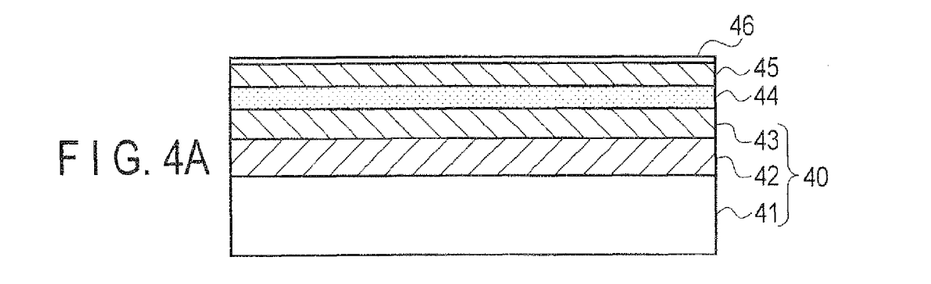
FIGS. 4A, 4B, 4C, 4D, 4E, 4F, 4G and 4H are cross-sectional views illustrating fabrication steps of a patterned medium according to the first embodiment.

To begin with, as shown in FIG. 4A, a support substrate 40 was fabricated by forming a CoZrNb layer (soft magnetic layer) 42 with a thickness of 120 nm and a Ru layer (alignment control underlayer which is also called an underlayer) 43 with a thickness of 20 nm on a discoidal glass substrate 41. A CoCrPt—SiO$_2$ layer (ferromagnetic recording layer) 44 with a thickness of 15 nm was formed on the support substrate 40. For the ferromagnetic recording layer 44, CoCrPt or CoPt can also be used. Then, a C layer (protection layer) 45 with a thickness of 15 nm, which serves as a mask material layer, was formed on the ferromagnetic recording layer 44. Subsequently, an adhesion layer 46 (3 to 5 nm) for adhering a UV imprint resist to the magnetic recording medium was formed on the protection layer 45. The material of the adhesion layer 46 can be selected from among CoPt, Cu, Al, NiTa, Ta, Ti, Si, Cr, and NiNbZrTi. In this example, Si was used.

Figure 4B:
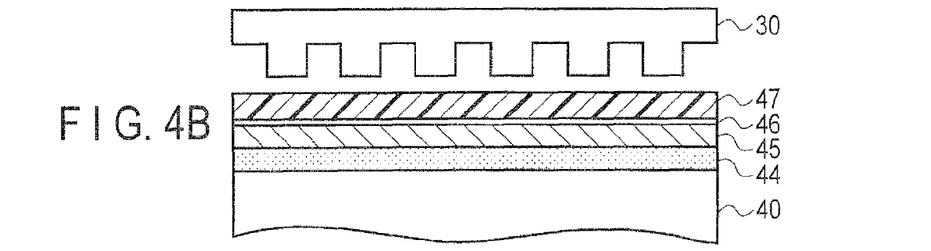

Subsequently, as shown in FIG. 4B, a UV imprint resist 47 with a thickness of 50 nm was coated on the adhesion layer 46 by a spin coat method. The resist 47 was provided for forming a pattern by the resin stamper 30 which was fabricated in the process of FIG. 1A to FIG. 1E. The UV imprint resist 47 is a material having ultraviolet-curing properties, and is composed of a monomer, an oligomer and a polymerization initiator. For example, isobornyl acrylate (IBOA) can be used for the monomer, polyurethane diacrylate (PUDA) can be used for the oligomer, and Darocure (trademark) 1173 can be used for the polymerization initiator. Further, the composition of each component can be set to be IBOA 85%, PUDA 10% and polymerization initiator 5%.

Figure 4C:
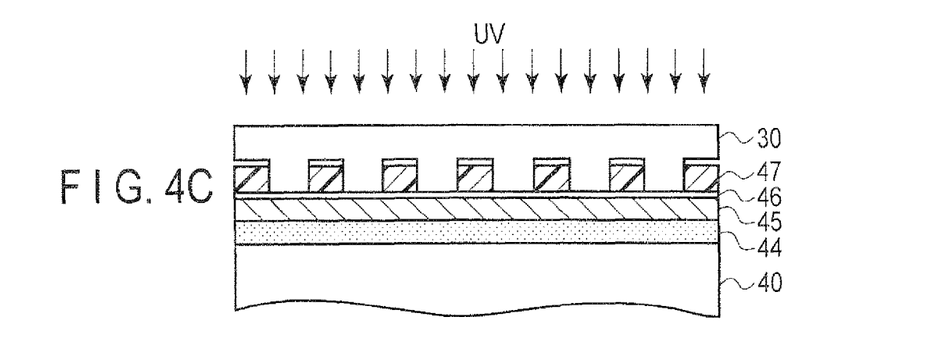

Next, as shown in FIG. 4C, the resin stamper 30 was adhered to the resist 47, and UV imprint was performed by radiating ultraviolet from the back side of the stamper 30.

Figure 4D:
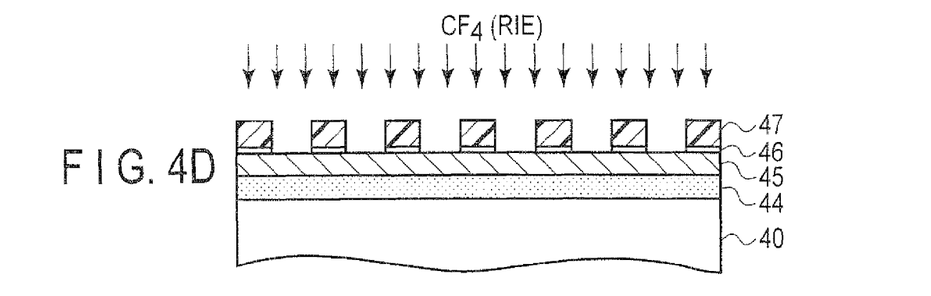

Then, as shown in FIG. 4D, after the resin stamper 30 was peeled from the resist 47, an imprint residual was removed by using a CF$_4$ plasma, or an argon ion beam. For example, etching is performed by using a CF$_4$ plasma for 15 seconds in an RIE apparatus with a chamber pressure of 0.3 Pa and an input power of 100 W. This process enables to remove a residual formed during the imprint process and the Si adhesion layer 46.

Figure 4E:
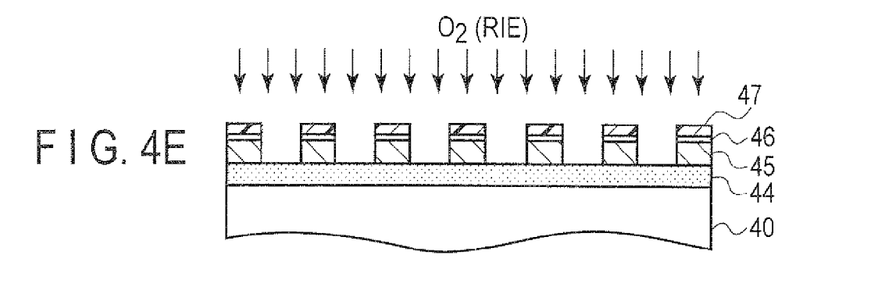

Subsequently, as shown in FIG. 4E, a C mask was fabricated by etching the protection film 45 by using an ICP etching apparatus (e.g. chamber pressure: 0.3 Pa, input power: 100 W) using oxygen gas. When this etching is finished, a major part of the resist 47 is removed.

Figure 4F:
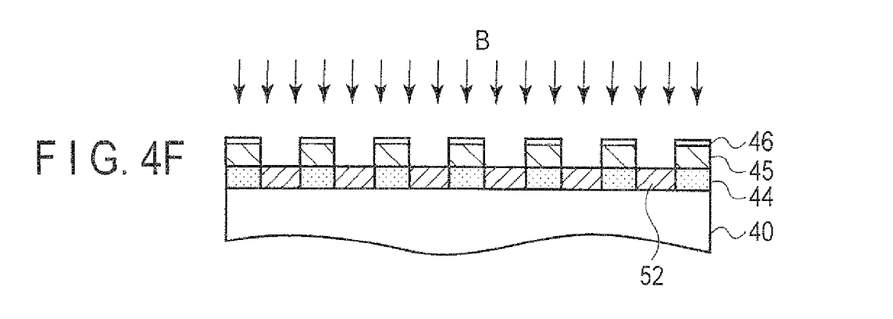

As the mask material, C, Mo, Ta, Ti, W or Cu can be used. When Mo, Ta, Ti or W is used as the mask material, it is suitable to use RIE using a fluorine-based gas in a mask peel step (FIG. 4G) which is being described later. The fluorine-based gas refers to CF$_4$, C$_2$F$_8$, CHF$_3$, SF$_6$ or the like. When mask peel is performed by RIE using the fluorine-based gas, re-adhesion matter will occur, so it is advisable to perform a washing step after the mask peel step. Such metallic masks can efficiently shield ions in an ion radiation step (FIG. 4F). This step is being described later. Cu can be used as the material of the metallic mask with a high shield effect. In the case where Cu is used for the mask, the mask peel is performed by Ar ion etching since the mask cannot be peeled by oxygen RIE or fluorine RTE. The mask can be easily peeled since Cu has a low resistance to Ar ion etching.

Subsequently, as shown in FIG. 4F, a B-based gas is exposed from above the fabricated mask. The B-based gas refers to B$_2$H$_6$, BF$_3$, borazine (BH—NH)$_3$, B$_{10}$H$_{14}$, B$_{18}$H$_{22}$, and C$_2$B$_{10}$H$_{12}$, or the like. Most of B-based gases are toxic, corrosive ones. Considering safety, borazine (BH—NH)$_3$ is suitable since it is not toxic or corrosive. In addition, B$_2$H$_6$, BF$_3$, and (BH—NH)$_3$ are effective, since these gases are decomposed by an electron cyclotron resonance (ECR) gas plasma and B is easily generated by the decomposition.

In this example, B$_2$H$_6$ gas was used and ionized by ECR, and ions were radiated on the sample at 1000 kV. Through this step, the ferromagnetism of the ion-radiated region is deactivated, and a magnetism-deactivated layer 52 is formed. At this time, the ion radiation enables the surface asperity of the magnetism-deactivated part 52 to be greater than that of the original ferromagnetic material.

Figure 4G:
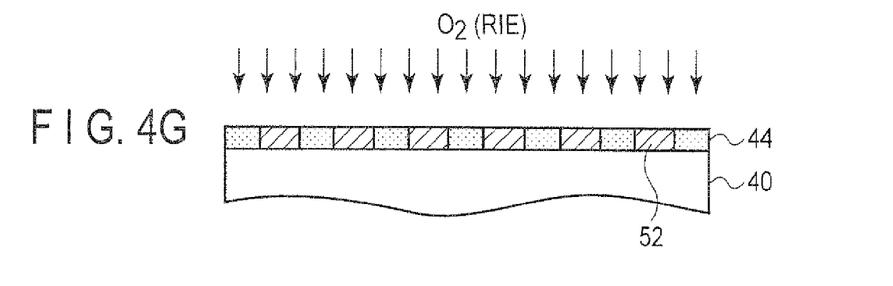

Then, as shown in FIG. 4G, an oxygen plasma process was performed by RIE (e.g. 13 Pa, 100 W, etching time of 30 seconds) using oxygen gas, thereby removing the C mask and the particles (a B thin film, a residual of resist) formed on the mask.

Figure 4H:
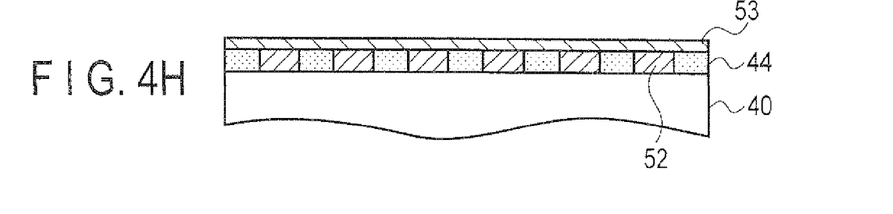

At last, as shown in FIG. 4H, a surface C protection film 53 with a thickness of 4 nm was formed by Chemical Vapor Deposition (CVD), and a lubricant was coated on the protection film 53. Thus, the DTR medium or BPM was obtained.

Figure 5A:
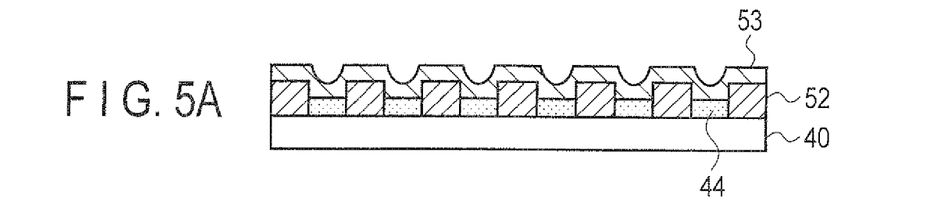
FIGS. 5A and 5B are cross-sectional views showing the structure of the patterned medium of the first embodiment in comparison with a comparative example.
Figure 5B:
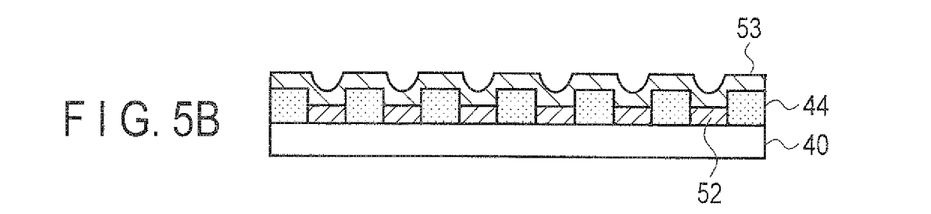
Figure 6A:
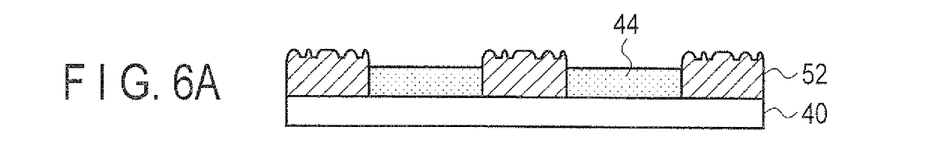
FIGS. 6A and 6B are cross-sectional views showing, in enlarged scale, the structure of the patterned medium of the first embodiment.
Figure 6B:
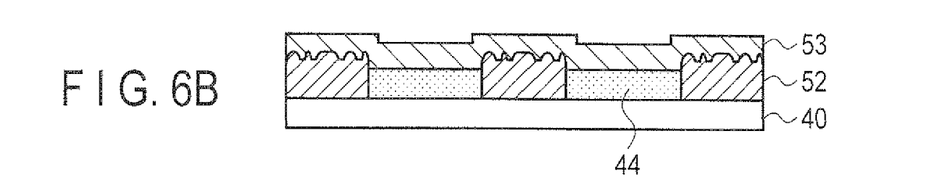

The structure of the thus fabricated patterned medium of the present embodiment is characterized, as shown in FIG. 5A, that the upper surface of the non-recording part (magnetism-deactivated part) 52 is slightly higher than the upper surface of the ferromagnetic recording layer (recording tracks, bits) 44. Specifically, in this structure, the surface asperity is 4 nm or less, the ferromagnetic recording layer 44 is a recessed part, and the magnetism-deactivated part 52 is a projecting part. This structure is reverse to a conventional structure shown in FIG. 5B. In addition, as shown in FIG. 6A and FIG. 6B, the surface asperity of the magnetism-deactivated part 52, which is a projecting part, is greater than that of the ferromagnetic recording layer 44 which is a recessed part.

The patterned medium of this embodiment has a feature that an HOD where the patterned medium is installed resists an impact such as a drop. The reason is as follows. When the recording head comes in contact with the patterned medium due to the impact such as a drop, the contacted recording part is broken and rendered non-recordable if the head contacts the recording part. However, in the structure of the present embodiment, the non-recording part contacts with the head because not the ferromagnetic recording part but the magnetism-deactivated part is the projecting part. Therefore, even if the recording head comes in contact with the patterned medium and the patterned medium is broken, recording status is kept because only the non-recording part is broken. In other words, in the conventional patterned media recording apparatus, the risk of losing a record of the user data due to an impact such as a drop is very high, but in the patterned media recording apparatus of the present embodiment, the risk of losing a record due to, e.g. a drop is low.

In the case where the non-recording part and the recording part are formed of different materials in different fabrication steps, the adhesion between the non-recording part and recording part is poor, and there is a very high possibility of breakage due to an impact such as a drop. By contrast, in the present embodiment, the magnetism-deactivated part 52 is constructed by partly denaturing the ferromagnetic recording layer 44 with B. Thus, the recording part and non-recording part are thin films which are formed of the same material in the same fabrication step. Therefore, the durability is remarkably improved, compared to the case in which the non-recording part and the recording part are formed of different materials in different fabrication steps.

The conventional patterned medium comprises a non-recording part which is formed of a nonmagnetic material, and a recording part which is formed of a ferromagnetic material. It is known that the surface of the nonmagnetic material has poor adhesion to a protection film C. Although the protection film C is formed by CVD, the CVD is a film forming method which is greatly affected by an underlayer. If a film of C is formed by CVD under conditions corresponding to the ferromagnetic material, the strength of C, which is formed on the nonmagnetic material, lowers. For example, in order to perform CVD, it is notable to heat the surface of the patterned medium up to about 200° C. If lamp heating is conducted in a vacuum, the ferromagnetic material is easy to be heated, and the nonmagnetic material is hard to be heated. In the case of the condition that the ferromagnetic material is heated up to 200° C., the temperature of the surface of the nonmagnetic part does not rise to 200° C. Thus, CVD film formation is performed locally at low temperatures on the nonmagnetic part alone, and the quality of the protection film C deteriorates and the strength lowers.

The non-recording part of the patterned medium of the embodiment is formed by adding B to the ferromagnetic recording layer which is formed in the above-described step of FIG. 4A. Hence, even if lamp heating is conducted in a vacuum, the temperature rise ratio is substantially equal between the recording part and the non-recording part. Therefore, a strong C protection film, which is free from a local temperature variation as in the prior art, can be fabricated. The degradation in strength of the C protection film is closely related to the adhesion to the underlayer, and the C protection film, which is more difficult to peel and is stronger, is obtained as the adhesion is higher.

In addition, as the surface asperity of the underlayer is higher, the adhesion between the underlayer and the C protection film 53, which is formed on the underlayer, is higher. Thus, in the patterned medium of the present embodiment, by intentionally increasing the surface asperity of the non-recording part 52, the strength of adhesion between the C protection film 53 and the non-recording part is increased. Thereby, a high resistance is obtained to the breakage of the patterned medium recording apparatus due to an impact such as a drop.

As has been described above, according to the present embodiment, the magnetism-deactivated part 52 is formed in the ferromagnetic recording layer 44 by making use of mixing by the radiation of the B-based gas. Thereby, a magnetic recording medium, in which the surface asperity can be reduced, can be manufactured without incurring process damage or increase in number of fabrication steps. Moreover, since the surface level of the non-recording part 52 is higher than that of the recording part 44, this enables to resist an impact such as a drop. Besides, since the surface asperity of the non-recording part 52 is large, the adhesion to the surface protection layer is improved, and the reliability can further be enhanced.

Second Embodiment

Figure 7:
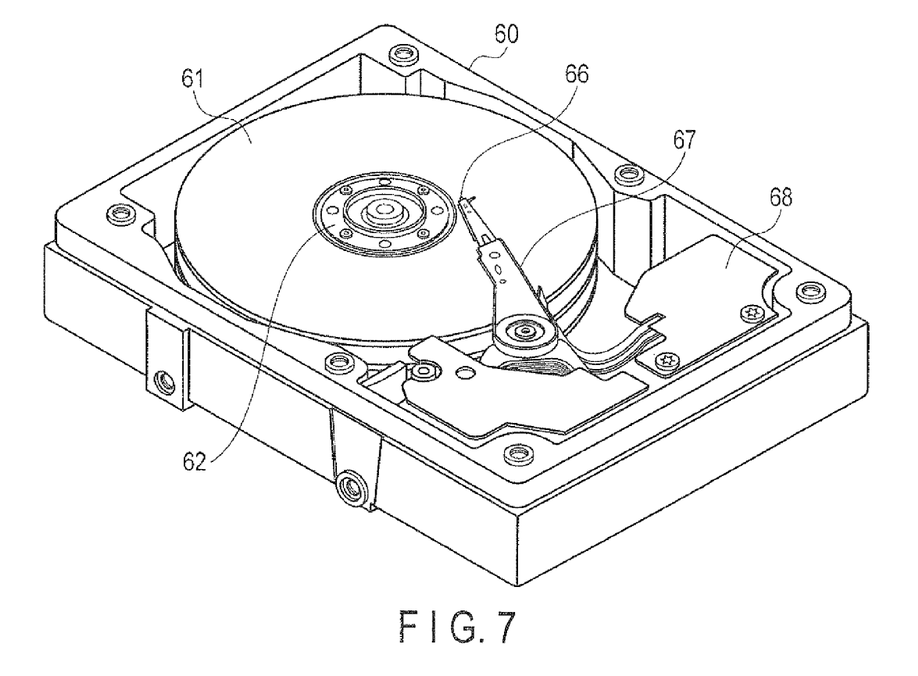
FIG. 7 is a perspective view which schematically shows the structure of a magnetic recording apparatus according to a second embodiment.

FIG. 7 is a perspective view which schematically shows the structure of a hard disk drive (magnetic recording apparatus) using a patterned medium.

This apparatus is of a type using a rotary actuator. A housing 60 includes a magnetic disk (magnetic recording medium) 61, a spindle motor 62, a head slider 66 including a magnetic head, a head suspension assembly 67 which supports the head slider 66, a voice coil motor 68, and a circuit board (not shown).

The magnetic disk 61 is a patterned medium, on which various kinds of digital data are recorded by a perpendicular magnetic recording method. The magnetic disk 61 is mounted on the spindle motor 62 and is rotated. The present apparatus can comprise a plurality of magnetic disks 61.

The head slider 66, which records/reproduces information in/from the magnetic disk 61, is attached to a distal end of a thin-film-shaped suspension. The head slider 66 has a magnetic recording head mounted on a distal end portion thereof.

The magnetic head, which is assembled in the head slider 66, is a so-called composite head, and includes a single-pole-type write head and a read head which uses a shield-type MR reproduction element (e.g. GMR or TMR).

The basic structure of the apparatus is the same as that of a conventional apparatus. However, the present embodiment differs from the conventional apparatus in that the patterned medium that is fabricated in the first embodiment is used as the magnetic disk 61. By using the patterned medium 61, the recording density can further be increased. In addition, as described above, the magnetism-deactivated part of the patterned medium 61 projects higher than the ferromagnetic recording part. Thus, even if the recording head and the patterned medium come in contact with each other due to an impact such as a drop, only the non-recording part is broken. Therefore, there is an advantage that the risk of losing a record due to, e.g. a drop is low.

Examples, which concretely illustrate the present embodiment, are being described.

Example 1

By the method illustrated in FIG. 4A to FIG. 4H, a DTR medium with 1 Tb/in$^2$ (track pitch TP: 50 nm) was fabricated. Borazine (BH—NH)$_3$ was used as an irradiation gas species, and a dry lift-off method using oxygen was used for etching. Borazine (BH—NH)$_3$ is advantageous in that it is not toxic or corrosive. The DTR medium was successfully fabricated without using a special gas-eliminating device. The surface asperity was 4 nm. The fabricated DTR medium was assembled in the drive. The bit error ratio (BER) was measured, and the BER of $10^{-7}$ was obtained.

Subsequently, a recording density test using DFH was conducted, and the recording with a recording density of 1.5 Tb/in$^2$ was confirmed. The reason for this is that the DFH could be strongly effected since the surface asperity was less than in the conventional DTR medium.

According to the present example, the DTR medium with a small surface asperity and a high recording density can be fabricated by a shallow deactivation process using the B-based gas.

Example 2

A DTR medium (TP: 50 nm) was fabricated by the same method as in Example 1, except that B$_2$H$_6$ or BF$_3$ was used as an irradiation gas species. The surface asperity was 4 nm. The fabricated DTR medium was assembled in the drive. The on-track BER was measured, and the BER of $10^{-7}$ was obtained.

Subsequently, a recording density test using DEH was conducted, and the recording with 1.5 Tb/in$^2$ was confirmed.

Since B$_2$H$_6$ and BF$_3$ are toxic and corrosive, the process apparatus needed to be equipped with a special gas-eliminating device. A heating-type elimination device which completely decomposes toxic, corrosive substances at high temperatures was used as the gas-eliminating apparatus.

According to the present example, even with a shallow deactivation process using the toxic, corrosive B-based gas, the same result as in Example 1 was obtained by using the heating-type elimination device.

Example 3

A DTR medium (TP: 50 nm) was fabricated by the same method as in the above-described Example 1. Cross-sectional transmission electron microscope (TEM) measurement of the GTE medium was conducted. It was confirmed that the DTR medium had the structure (the structure of FIG. 6A and FIG. 6B) in which a projection part was a non-recording part and the asperity was 4 nm.

In addition, DTR media with different asperities were fabricated by varying the process condition of the above-described step of FIG. 4F. Specifically, the acceleration voltage, the gas flow rate and the in-chamber pressure were varied. Samples with asperities of 0 to 18 nm were fabricated.

Figure 8:
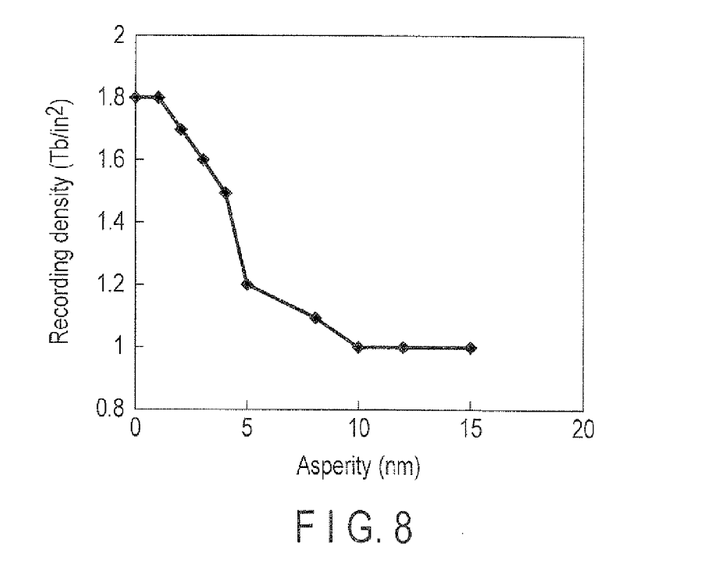
FIG. 8 is a characteristic graph showing the relationship between the surface asperity of a DTR medium and the recording density.

Recording density tests were conducted, and the relationship between the asperity and recording density was examined, as shown in FIG. 8. In the samples with the asperity of 15 nm or more, the recording head did not levitate, and recording density tests could not be conducted. The recording density was constant in the case where the asperities were in the range of 10 to 15 nm, and there was a tendency that the recording density was higher as the asperity was smaller in the case where the asperities were 8 nm or less. In addition, when the asperity was 4 nm or less, the recording density was remarkably improved, and was 1.5 times higher than the reference. From this result, the recording density is better as the asperity is smaller, and the suitable asperity is 8 nm or less, and notably 4 nm or less.

Example 4

A DTR medium (TP: 50 nm) was fabricated by the same method as in the above-described Example 1. Cross-sectional transmission electron microscope (TEM) measurement of the DTR medium was conducted. It was confirmed that a projection part was a non-recording part. The physical composition of the projecting non-recording part was analyzed by energy dispersive X-ray spectroscopy (EDX), and it was found that the projecting non-recording part was composed of the elements of Co, Cr, Pt and B. The B content was 15 at %.

Figure 9:
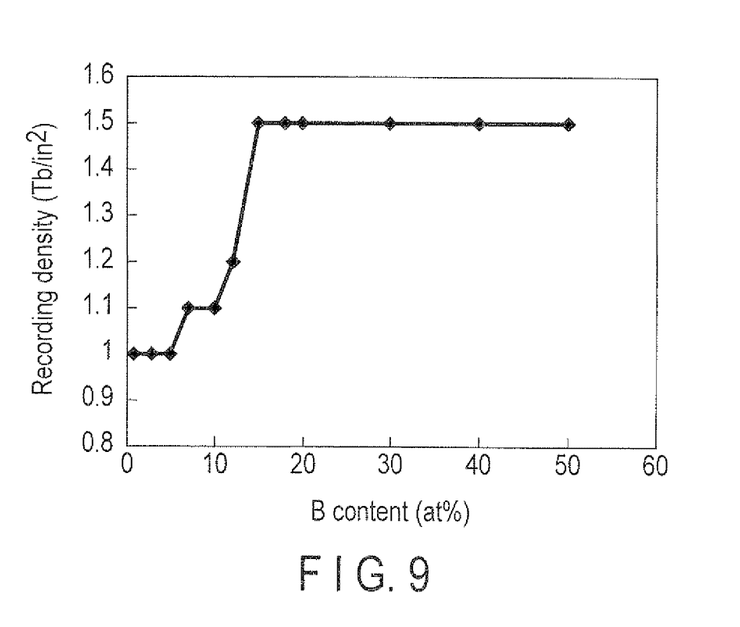
FIG. 9 is a characteristic graph showing the relationship between the B (Boron) content in a non-recording part of a DTR medium and the recording density.

Then, DTR media were fabricated by varying the conditions of the above-described step of FIG. 4F. FIG. 9 shows the amount of B analyzed by EDX, and results of recording density tests using DFH. As the B content increases, the recording density becomes higher. The improvement of the recording density is saturated when the B content is 15 at % or more. When the B content is 8 at % or more, the improvement in density is observed, compared to the reference (1.0 Tb/in$^2$), but the degree of improvement in density is 1.1 times higher and is not so great.

Subsequently, recording density tests using DFH were conducted. Samples, on which recording of 1.5 Tb/in$^2$ could be confirmed, were analyzed by EDX, and it was found that the B content was 15 at %. Samples were fabricated by varying the process conditions of the step of FIG. 4F, and when the B content was examined by EDX, substantially the same result as in FIG. 9 was obtained. From this result, it was understood that the performance of the patterned medium was determined not by the method of fabrication, but by the amount of B in the non-recording region. It is suitable to set the B content at 8 at % or more, and notably 15 at % or more. If an increasing amount of B is mixed in a CoPt-based alloy, soft magnetization occurs if the B content is 5 at % or more and is less than 15 at %. Thus, it is possible that soft magnetization is caused in a non-recording part of a DTR medium in which the B content is 8 at % or more and is less than 15 at %, and that an unexpected fault may occur. The content of 50 at % or more is excessive for fabricating the non-recording part, and is not desirable since a thin-film surface may be roughened.

Figure 10:
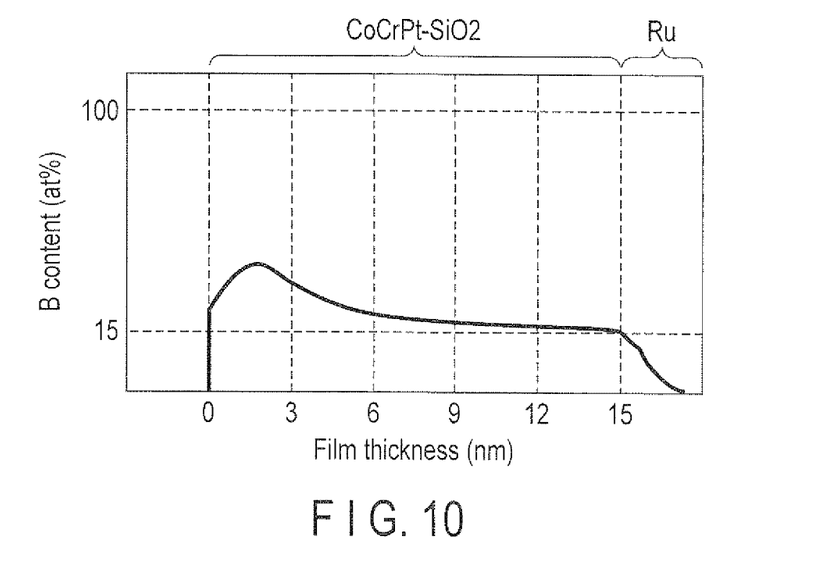
FIG. 10 is a characteristic graph showing the relationship between the position in thickness direction of the non-recording part of a DTR medium and the B (Boron) content.

In this case, in order to enhance the detection sensitivity, the B content was measured under the condition that all B content, which is present down to a depth of about 20 nm from the sample surface, was measured. As shown in FIG. 10, the actual B content is not constant in the depth direction of the magnetic layer. Thus, the B content described here indicates an average B content included in the magnetic layer.

Subsequently, a depth-directional analysis by EDX was conducted of the non-recording part of the DTR medium that was fabricated by the method of Example 1. A peak of the B content appears at 2 to 3 nm from the surface, the B content gradually decreases as the depth increases, and the B content sharply decreases in the underlying Ru layer. The reason for this is that borazine $(BH-NH)_3$ is directly implanted in the ferromagnetic layer.

According to the present example, as described above, by setting the B content at 15 at % or more and at less than 50 at %, both the surface condition and the high recording density can be satisfied.

Example 5

DTR media (TB: 50 nm) were fabricated by the same method as in the above-described Example 1, and magnetic recording apparatuses as shown in FIG. 7 were fabricated. Impact tests were conducted by dropping the magnetic recording apparatuses from the height of 2 m. Faults occurred in three of fifty apparatuses. Subsequently, the same tests were conducted by incorporating DTR media, which were fabricated by a general method, into magnetic recording apparatuses, and faults were confirmed in 23 apparatuses, or about half the apparatuses. It turned out that the magnetic recording apparatus, in which the patterned medium of the present example was mounted, had high resistance to an impact such as a drop.

According to the present example, as described above, the patterned medium has a strong protection film, and has high resistance to an impact such as a drop.

Example 6

Figure 11:
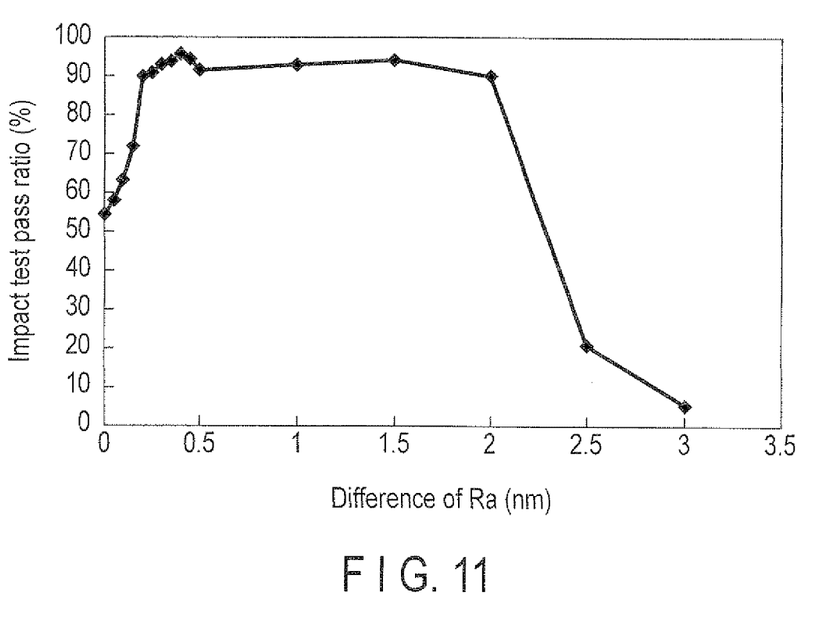
FIG. 11 is a characteristic graph showing the relationship between a different of surface asperity Ra and an impact test pass ratio.

The apparatus, which underwent the impact test in the above-described Example 5, was disassembled, and the surface of the mounted DTR medium was measured by an atomic force microscope (AFM). The result was that the recording part surface asperity (Ra) was 0.65 nm, and the non-recording part Ra was 1.00 nm. It was considered that the difference of Ra between the recording part and the non-recording part was related to the C protection film strength of the patterned medium. The relationship between the Ra difference, between the non-recording part and recording part, and the impact test pass ratio (the probability that the apparatus including the DTR medium does not abnormally operate after an impact is applied to the apparatus) was examined. As a result, characteristics as shown in FIG. 11 were obtained.

Samples having the difference of Ra in the range of 0.2 nm or more and 2.0 nm or less have the pass ratio of 90% or more. Samples having the difference of Ra of less than 0.2 nm have low impact test pass ratios, and this reflects the fact that the strength of the C protection film on the recording part and the strength of the protection film on the non-recording part are greatly different and the resistance to impacts lowers. Samples having the difference of Ra of more than 2.0 nm have extremely low impact test pass ratios, and this is because the Ra of the non-recording part deteriorates (about 3 nm), the levitation properties of the recording head deteriorate, and the resistance to impacts lowers.

According to the present example, the resistance to impacts can be increased by setting the difference of Ra between the non-recording part and recording part at 0.2 nm or more and 2.0 nm or less.

Example 7

The principle verification was conducted for fabricating the patterned medium by the manufacturing method according to the present embodiment. Samples were fabricated by the same manufacturing method as in FIG. 4A to FIG. 4, except that patterns are not formed. Magnetization was examined by a vibrating sample magnetometer (VSM), and zero magnetization was confirmed. Although ions of He, Ne and Ar were confirmed, magnetization was zero in all samples. Subsequently, samples, in which B-based gas irradiation was not conducted in the step of FIG. 4F, were fabricated, and the magnetization intensity was similarly measured by the VSM. The measurement result of 450 emu/cc was obtained.

By these fundamental studies, it was understood that the magnetization intensity of the magnetism-deactivated part was zero and the magnetization intensity of the recording part was about 450 emu/cc which was equal to a value of a general perpendicular recording film.

Example 8

A BPM was fabricated by the same method as in Example 1, except that the pattern shown in FIG. 3 was drawn by EB drawing. The bit size of the fabricated BPM was 20 nm×20 nm. As regards the BPM, the definition of the BER is not possible, so a comparison based on signal amplitude intensity was made. Magnetization was fixed in one direction, and the BPM was assembled in the drive. The reproduction waveform was observed, and a signal amplitude intensity of 200 mV was obtained.

In this manner, it was found that the BPM can be fabricated by the same method as the DTR media.

(Modifications)

The present invention is not limited to the above-described embodiments and examples.

In the embodiments, the glass substrate is used, but use may also be made of an Al-based alloy substrate, a ceramic substrate, a carbon substrate, a Si single-crystal substrate with an oxidized surface, and these substrates which are plated with NiP, etc. The glass substrate is, for instance, an amorphous glass or a crystalline glass. As the amorphous glass, use may be made of general-purpose soda lime glass, or aluminosilicate glass.

As the crystalline glass, use may be made of lithium-based crystalline glass. As the ceramic substrate, use may be made of a sintered body mainly comprising general-purpose aluminum oxide, aluminum nitride or silicon nitride, or a fiber-reinforced body thereof. As the substrate, use may be made of, as well as the above-described metallic substrate, a non-metallic substrate on which a NiP layer is formed by plating or sputtering. A general method of forming a thin film on the substrate is sputtering, but the same effect can be obtained by vacuum evaporation or electroplating.

A soft magnetic layer (soft underlayer) (SUE) has a part of the function of a magnetic head, which causes a recording magnetic field from a magnetic head for magnetizing a perpendicular magnetic recording layer, for instance, a single-pole-type head, to flow back to the magnetic head side in the horizontal direction. Further, the soft magnetic layer (soft underlayer) may have a function of applying a sharp, sufficient perpendicular magnetic field to the recording layer in the field, and improving the recording efficiency. Thus, a material including Fe, Ni, or Co may be used for the soft magnetic layer (soft underlayer).

Examples of such materials are as follows. Examples of a FeCo-based alloy include FeCo and FeCoV. Examples of a FeNi-based alloy include FeNi, FeNiMo, FeNiCr and FeNiSi. Examples of a FeAl-based alloy and a FeSi-based alloy include FeAl, FeAlSi, FeAlSiCr, FeAlSiTiRu, and FeAlO. Examples of a FeTa-based alloy include FeTa, FeTaC and FeTaN. Examples of a FeZr-based alloy include FeZrN. As the material of the soft magnetic layer, use may be made of a material having a microcrystalline structure of FeAlO, FeMgO, FeTaN, FeZrN, etc. including 60 at % of Fe, or a material having a granular structure in which fine crystalline particles are disposed in a matrix.

Other usable materials of the soft magnetic layer include a Co alloy including Co and at least one selected from among Zr, Hf, Nb, Ta, Ti and Y. Notably, 80 at % of Co is included. When a film of such a Co alloy is formed by sputtering, an amorphous layer tends to be easily formed. The amorphous soft magnetic material exhibits very excellent soft magnetism since it is free from crystal magnetic anisotropy, crystal defects, or grain boundaries. By using the amorphous soft magnetic material, the noise of the medium can be reduced. Examples of a suitable amorphous soft magnetic material include CoZr, CoZrNb, and a CoZrTa-based alloy. Under the SUL, an additional underlayer may be provided in order to improve the crystallinity of the SUL or to improve the adhesion to the substrate.

As the material of the underlayer, use may be made of Ti, Ta, W, Cr or Pt, or an alloy including these elements, or an oxide or a nitride thereof. An intermediate layer, which is formed of a nonmagnetic material, may be provided between the SUL and the recording layer. The intermediate layer has two functions, that is, a function of shutting off an exchange coupling interaction between the SUL and the recording layer, and a function of controlling the crystallinity of the recording layer. Examples of the material of the intermediate layer include Ru, Pt, Pd, W, Ti, Ta, Cr or Si, or an alloy including these elements, or an oxide or a nitride thereof. In order to prevent spike noise, the SUP may be divided into a plurality of layers, and antiferromagnetic coupling may be effected by inserting Ru with a thickness of 0.5 to 1.5 nm. Besides, a pinned layer, which is formed of a hard magnetic film with in-plane anisotropy of CoCrPt, SmCo, FePt, etc., or an antiferromagnetic material such as IrMn, PtMn, etc., may be exchange-coupled to the soft magnetic layer. In this case, in order to control the exchange coupling force, magnetic films (e.g. Co) or nonmagnetic films (e.g. Pt) may be stacked on both sides of the Ru layer.

It should suffice if the ferromagnetic recording layer (perpendicular magnetic recording layer) is formed of a material including Co as a main component and including at least Pt. A material including Cr or an oxide, in addition to these components, may be used. In particular, silicon oxide or titanium oxide is suitable as the oxide. Notably, magnetic particles (crystalline particles having magnetism) should be dispersed in the perpendicular magnetic recording layer. Notably, the magnetic particles should have columnar structures vertically penetrating the perpendicular magnetic recording layer. By forming such structures, the alignment and crystallinity of the magnetic particles of the perpendicular magnetic recording layer can be made excellent and, as a result, a signal/noise ratio (S/N ratio) that is suitable for high-density recording can be obtained. In order to obtain such structures, the amount of the contained oxide is important. The content of the oxide should be, notably, 3 mol % or more and 12 mol % or less, relative to the total amount of Co, Cr and Pt. More notably, the content of the oxide should be 5 mol % or more and 10 mol % or less.

The above-mentioned range is notable as the content of the oxide in the perpendicular magnetic recording layer, because when the layer is formed, the oxide is precipitated around the magnetic particles and the magnetic particles can be isolated and made finer. When the content of the oxide exceeds the above-described range, the oxide remains in the magnetic particles, the alignment and crystallinity of magnetic particles are degraded, and further the oxide is precipitated on the upper and lower sides of the magnetic particles. As a result, the columnar structure, in which the magnetic particles vertically penetrate the perpendicular magnetic recording layer, is undesirably not formed. When the content of the oxide is less than the above-described range, the isolation and reduction in size of magnetic particles are not sufficient. As a result, undesirably, the noise at the time of recording increases, and the signal/noise ratio (S/N ratio) that is suitable for high-density recording cannot be obtained.

The Cr content of the perpendicular magnetic recording layer should be, notably, 16 at %. More notably, the Cr content should be 10 at % or more and 14 at % or less. The Cr content is set in the above range because a uniaxial crystal magnetic anisotropy constant Ku of magnetic particles is not excessively lowered, high magnetization is maintained, and, as a result, recording characteristics suitable for high-density recording and sufficient heat fluctuation characteristics can be obtained. If the Cr content exceeds the above-described range, the Ku of the magnetic particles decreases, and consequently the heat fluctuation characteristics deteriorate and the crystallinity and alignment of the magnetic particles are degraded. As a result, the recording characteristics deteriorate.

The Pt content of the perpendicular magnetic recording layer should be, notably, 10 at % or more and 25 at % or less. The Pt content is set in the above range because the Ku that is necessary for the perpendicular magnetic layer is obtained, the crystallinity and alignment of the magnetic particles are good, and, as a result, heat fluctuation characteristics and recording characteristics suitable for high-density recording can be obtained. If the Pt content exceeds the above-described range, a layer of an fcc structure may undesirably be formed in the magnetic particles, and the crystallinity and alignment of the magnetic particles may be degraded. If the Pt content is less than the above-described range, the Ku for obtaining heat fluctuation characteristics, which are suitable high-density recording, cannot be obtained undesirably.

The perpendicular magnetic recording layer may include, in addition to Co, Cr, Pt and the oxide, at least one element selected from among B, Ta, Mo, Cu, Nd, W, Nb, Sm, Tb, Ru and Re. By the inclusion of such elements, the reduction in size of the magnetic particles can be promoted, or the crystallinity and alignment can be improved, and recording characteristics and heat fluctuation characteristics, which are more suitable for high-density recording, can be obtained. The total content of the above-mentioned elements should be, notably, 8 at % or less. When the total content exceeds 8 at %, a phase other than an hop phase is formed in the magnetic particles, and hence the crystallinity and alignment of magnetic particles are degraded. As a result, the recording characteristics and heat fluctuation characteristics, which are suitable for high-density recording, cannot be obtained.

As the material of the perpendicular magnetic recording layer, use may be made of, in addition to the above, a CoPt-based alloy, a CoCr-based alloy, a CoPtCr-based alloy (CoPtO, CoPtCrO, CoPtSi, CoPtCrSi), a multilayer structure of an alloy including as a main component at least one selected from the group consisting of Pt, Pd, Rh and Ru, and Co, and CoCr/PtCr, CoB/PdB, and CoO/RhO which are obtained by adding Cr, B and O to the multilayer structure.

The thickness of the perpendicular magnetic recording layer is notably 5 to 60 nm, and more notably 10 to 40 nm. If the thickness is in this range, the magnetic recording apparatus can operate as one which is more suitable for high recording density. If the thickness of the perpendicular magnetic recording layer is less than 5 nm, there is a tendency that the reproduction output is too low and the noise component becomes higher than the reproduction output. If the thickness of the perpendicular magnetic recording layer exceeds 40 nm, there is a tendency that the reproduction output is too high and the waveform is distorted. The coercivity of the perpendicular magnetic recording layer should be, notably, 237000 A/m (3000 Oe) or more. If the coercivity is less than 237000 A/m (3000 Oe), there is a tendency that the resistance to heat fluctuation deteriorates. The perpendicular squareness ratio of the perpendicular magnetic recording layer should be, notably, 0.8 or more. If the perpendicular squareness ratio is less than 0.8, there is a tendency that the resistance to heat fluctuation deteriorates.

The UV imprint resist is a material having ultraviolet-curing properties, and is composed of a monomer, an oligomer, and a polymerization initiator. No solvent is included. Examples of the monomer material are as follows.

*Acrylates
  Bisphenol A-ethylene oxide-denatured diacrylate (BPEDA)
  Dipentaerythritol hexa(penta)acrylate (DPEHA)
  Dipentaerythritol monohydroxypentaacrylate (DPEHPA)
  Dipropylene glycol diacrylate (DPGDA)
  Ethoxylated trimethylolpropane triacrylate (ETMPTA)
  Glycerin propoxy triacrylate (GPTA)
  4-hydroxybutyl acrylate (HBA)
  1,6-hexanediol diacrylate (HDDA)
  2-hydroxyethyl acrylate (HEA)
  2-hydroxypropyl acrylate (HPA)
  Isobornyl acrylate (IBOA)
  Polyethylene glycol diacrylate (PEDA)
  Pentaerythritol triacrylate (PETA)
  Tetrahydrofurfuryl acrylate (THFA)
  Trimethylolpropane triacrylate (TMPTA)
  Tripropylene glycol diacrylate (TPGDA)

*Methacrylates
  Tetraethylene glycol dimethacrylate (4EDMA)
  Alkylmethacrylate (AKMA)
  Arylmethacrylate (AMA)
  1,3-butylene glycol dimethacrylate (BDMA)
  n-butylmethacrylate (BMA)
  Benzylmethacrylate (BZMA)
  Cyclohexyl methacrylate (CHMA)
  Diethylene glycol dimethacrylate (DEGDMA)
  2-ethyl hexyl methacrylate (EHMA)
  Glycidyl methacrylate (GMA)
  1,6-hexanediol dimethacrylate (HDDMA)
  2-hydroxyethyl methacrylate (2-HEMA)
  Isobornyl methacrylate (IBMA)
  Lauryl methacrylate (LMA)
  Phenoxyethyl methacrylate (PEMA)
  t-butyl methacrylate (TBMA)
  Tetrahydrofurfuryl methacrylate (THFMA)
  Trimethylolpropane trimethacrylate (TMPMA)

Of these materials, in particular, IBOA, TPGDA, HDDA, DPGDA, NPDA and TITA are excellent since the viscosity of these can be set at 10 CP or less.

As the oligomer material, use may be made of, for instance, a urethaneacrylate-based material, polyurethane diacrylate (PUDA), polyurethane hexaacrylate (PUHA), polymethyl methacrylate (PMMA), fluorinated polymethyl methacrylate (PMMA-F), polycarbonate diacrylate, or fluorinated polycarbonate methylmethacrylate (PMMA-PC-F).

As the polymerization initiator, use is made of Irgacure (trademark) 184, Darocure (trademark) 173, etc.

The adhesion layer is a layer for adhering the UV imprint resist and the perpendicular recording film. The adhesion layer should notably be formed of a material which has a resistance to $O_2$ or $O_3$ gas and contains, as a main component, Al, Ag, Au, Co, Cr, Cu, Ni, Pd, Pt, Si, Ta, or Ti. The thickness of the adhesion layer should be, notably, 1 to 15 nm.

In the residual removal, the residual of the resist is removed by reactive ion etching (RIE). As a plasma source, an inductively coupled plasma (ICP), which can generate a high-density plasma at low pressure, is suitable. However, an ECR plasma or a general parallel-plate type RIE apparatus may be used.

The protection layer is provided in order to prevent corrosion of the perpendicular magnetic recording layer and to prevent damage to the medium surface when the magnetic head comes in contact with the medium. An example of the material of the protection layer is a material including, for example, C, $SiO_2$, or $ZrO_2$. The thickness of the protection layer should be, notably, 1 to 10 nm. This thickness is suitable for high-density recording, since the distance between the head and the medium can be reduced. Carbons can be classified into sp2-bond carbon (graphite) and sp3-bond carbon (diamond). The sp3-bond carbon is superior to graphite with respect to durability and corrosion resistance, but is inferior to graphite with respect to surface smoothness since the sp3-bond carbon is crystalline. Usually, a film of carbon is formed by sputtering, with use of a graphite target. In this method, amorphous carbon, in which sp3-bond carbon and sp3-bond carbon are mixed, is formed. Carbon, in which the ratio of sp3-bond carbon is greater, is called diamond-like carbon (DLC). This carbon has good durability and corrosion resistance and also has good surface smoothness since it is amorphous. Thus, this carbon is used as the surface protection film of the magnetic recording medium.

In the film formation of DIG by a CVD method, a material gas is excited and decomposed in a plasma, and DLC is generated by a chemical reaction. Thus, by matching conditions, DLC which is richer in sp3-bond carbon can be formed. A lubrication layer lay be provided on the protection layer. As a lubricant which is used for the lubrication layer, use may be made of a conventionally publicly known material, such as perfluoropolyether, fluoroalcohol, or fluorinated carboxylic acid.

The C protection film should desirably be formed by CVD in order to improve coverage on asperities, but sputtering or vacuum evaporation may be used. When the C protection film is formed by CVD, a DLC film containing a large quantity of sp3-bond carbon is formed. If the film thickness is 2 nm or less, the coverage undesirably lowers. If the film thickness is 10 nm or more, the magnetic spacing between the recording head and the medium increases and the SNR lowers undesirably.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic recording medium comprising:
a ferromagnetic recording part formed on a discoidal substrate, the ferromagnetic recording part comprising a ferromagnetic film, a track pattern having a pattern formed of a plurality of tracks or a bit pattern having a pattern formed of a plurality of bits being formed on the ferromagnetic film, and
a ferromagnetism-deactivated part formed in a region for isolating the ferromagnetic recording part between the tracks or the bits, the ferromagnetism-deactivated part having a content of implanted B set at 15 at % or more and having a height higher than a height of the ferromagnetic film, wherein
a thickness of the ferromagnetism-deactivated part is greater than a thickness of the ferromagnetic recording part, and
a surface asperity of the ferromagnetism-deactivated part is greater than a surface asperity of the ferromagnetic recording part.

2. The magnetic recording medium of claim 1, wherein a difference between the surface asperity of the ferromagnetism-deactivated part and the surface asperity of the ferromagnetic recording part is 0.2 nm or more and 2 nm or less.

3. The magnetic recording medium of claim 1, wherein the substrate includes a disk body, a soft magnetic layer formed on the disc body, and an underlayer formed on the soft magnetic layer.

4. A magnetic recording apparatus comprising:
a magnetic recording medium having a ferromagnetic recording part and a ferromagnetism-deactivated part comprising a ferromagnetic film on a discoidal substrate, a track pattern having a pattern formed of a plurality of tracks or a bit pattern having a pattern formed of a plurality of bits being formed on the ferromagnetic film, the ferromagnetism-deactivated part being formed in a region for isolating the ferromagnetic recording part between the tracks or the bits, the ferromagnetism-deactivated part having a content of implanted B set at 15 at % or more and having a height higher than the ferromagnetic film;
a rotating mechanism configured to hold and rotate the magnetic recording medium; and
a magnetic head configured to record/reproduce information in/from the magnetic recording medium, wherein
a thickness of the ferromagnetism-deactivated part is greater than a thickness of the ferromagnetic recording part, and
a surface asperity of the ferromagnetism-deactivated part is greater than a surface asperity of the ferromagnetic recording part.

5. The magnetic recording apparatus of claim 4, wherein a difference between the surface asperity of the ferromagnetism-deactivated part and the surface asperity of the ferromagnetic recording part is 0.2 nm or more and 2 nm or less.

6. The magnetic recording apparatus of claim 4, wherein the substrate includes a disk body, a soft magnetic layer formed on the disc body, and an underlayer formed on the soft magnetic layer.

* * * * *